(12) United States Patent
Liu et al.

(10) Patent No.: US 10,976,455 B2
(45) Date of Patent: Apr. 13, 2021

(54) TEST SYSTEM FOR MICROSEISMIC TEST OF ROCK MASS FRACTURES

(71) Applicant: Sichuan University, Chengdu (CN)

(72) Inventors: Jianfeng Liu, Chengdu (CN); Jianliang Pei, Chengdu (CN); Lu Wang, Chengdu (CN); Huining Xu, Chengdu (CN); Xiaozhang Lei, Chengdu (CN); Wenxi Fu, Chengdu (CN); Jianhui Deng, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 446 days.

(21) Appl. No.: 16/008,044

(22) Filed: Jun. 14, 2018

(65) Prior Publication Data
US 2018/0364377 A1  Dec. 20, 2018

(30) Foreign Application Priority Data

Jun. 14, 2017  (CN) .......................... 201710447545.0

(51) Int. Cl.
*G01V 1/16* (2006.01)
*G01V 1/18* (2006.01)

(52) U.S. Cl.
CPC .............. *G01V 1/166* (2013.01); *G01V 1/181* (2013.01); *G01V 2210/123* (2013.01); *G01V 2210/1232* (2013.01); *G01V 2210/1429* (2013.01)

(58) Field of Classification Search
CPC .................. G01V 1/166; G01V 1/181; G01V 2210/1232; G01V 2210/123; G01V 2210/1429
See application file for complete search history.

(56) References Cited

U.S. PATENT DOCUMENTS

| | | | |
|---|---|---|---|
| 9,016,360 B2* | 4/2015 | Cheon .................... | G01V 1/008 166/66 |
| 2003/0179651 A1* | 9/2003 | Nutt ......................... | G01V 1/40 367/25 |
| 2008/0006474 A1* | 1/2008 | Tonelli .................. | G01V 1/186 181/122 |
| 2016/0356145 A1* | 12/2016 | Andreychuk ......... | E21B 47/002 |

* cited by examiner

*Primary Examiner* — Ian J Lobo
(74) *Attorney, Agent, or Firm* — Bayramoglu Law Offices LLC (57) ABSTRACT

A test system for a microseismic test of rock mass fractures provided by the present invention includes at least one microseismic sensor, a push rod provided at two ends of the microseismic sensor through a connecting mechanism for feeding the microseismic sensor into a monitoring hole, an introducing mechanism mounted on the push rod for introducing the microseismic sensor into the monitoring hole, a hydraulic system providing support hydraulic oil for the microseismic sensor, a microseismic monitoring computer connected with the signal of microseismic sensor through; the microseismic sensor includes a microseismic probe, a holding component holding the microseismic probe, a support plate and a hydraulic support mechanism; the connecting mechanism can make the push rod swing relative to the microseismic sensor, and the introducing mechanism is three-rollers introducing mechanism.

20 Claims, 6 Drawing Sheets

TEST SYSTEM FOR MICROSEISMIC TEST OF ROCK MASS FRACTURES

CROSS REFERENCE TO RELATED APPLICATIONS

This application is based on and claims priority to the Chinese patent application No. 2017104475450, filed on Jun. 14, 2017, the entire contents of which are incorporated herein by reference.

TECHNICAL FIELD

The invention relates to the technical field of engineering geological microseismic monitoring, and particularly relates to a test system for a microseismic test with reusable microseismic sensor.

BACKGROUND

Rock (rock mass) deformation and damage in engineering construction, especially rock burst dynamic disaster, may directly endanger the safety of the construction of the engineering and can even cause catastrophic impact. Therefore, effective monitoring and prediction of rock (rock mass) stability and rock burst dynamic disaster is one of the important contents of safety in civil engineering. As an important means of non-destructive monitoring, microseismic is used for the monitoring and prediction of rock (rock mass) stability and rock burst dynamic disaster in engineering construction.

During the construction of surrounding rock excavation for underground engineering, microseismic monitoring sensors need to be fixed in the surrounding rock area to be monitored before the excavation in order to accurately predict the possible deformation and failure of the surrounding rock and the dynamic disaster. To use the microseismic technology to accurately determine the locations where surrounding rock failure and dynamic disaster may occur, microseismic sensors need to be arranged in a three-dimensional spatial distribution around the rock mass to be monitored, the more the sensors and the more reasonable is the distribution, the more accurate are the monitoring results. In order to realize the real-time monitoring of the excavation process of the rock mass, it is necessary to drill a monitoring hole in the rock (rock mass) by a drilling machine before the excavation of the rock (rock mass) and install a microseismic sensor in the monitoring hole. The depth of the monitoring hole depends on the buried depth of excavation and the monitored area, the depth of the monitoring hole increases with the increase of buried depth of the engineering and the monitored area. Some monitoring holes are several tens of meters deep or even hundreds of meters deep. For a monitoring hole with a large depth, multiple microseismic sensors are usually used to monitor microseisms in different parts of the monitoring hole, the deeper the monitoring hole is, the more microseismic sensors are installed. It is difficult to ensure concentricity between the upper and lower monitoring holes, and it is difficult to keep the wall surfaces of the monitoring holes smooth, so it is difficult to install microseismic sensors.

The microseismic sensor is expensive. In order to retrieve the microseismic sensor after the monitoring is completed and reduce the engineering cost, in the on-site installation of the microseismic monitoring sensor in the engineering, the microseismic sensor is usually placed directly in the monitoring hole, and the residual water in the monitoring hole is used as a medium for signal transmission between the rock mass and the sensor. However, this method has the following disadvantages: first, the direction of the monitoring hole must be downward, this method is not suitable for monitoring holes that are completely horizontal or have a certain upward angle; second, for inclined or downward monitoring holes, the rock mass needs to be relatively intact, the monitoring hole needs to hold the injected water without losing water along the cracks in the monitoring hole, or avoid seepage from the inside of the monitoring hole to ensure that the sensor is always in the water, but the actual situation on site is difficult to meet these requirements; third, although water can be used as a coupling medium for signal transmission, the density of water is lower and its transmission effect is not as good as that of the sensor directly contacting with the rock wall; fourth, since the liquid can only transmit longitudinal waves and cannot transmit transverse waves, the location of the rock breaking signal on site must be determined by relying on the transverse wave signal, therefore this method results in the loss of a large number of monitoring signals and the reliability of the monitoring results is greatly reduced.

In order to ensure effective coupling between the microseismic sensor arranged in the monitoring hole and the monitoring hole wall, some people poured cement into the monitoring hole at the project site to make the sensor and the rock wall as a whole. This method has the following disadvantages: first, the sensor after pouring cement cannot be recycled, resulting in high economic costs; second, if there is no signal or the signal is bad after pouring cement, the sensor cannot be checked, in order to ensure the monitoring effect, it is necessary to re-drill a monitoring hole and re-install microseismic sensors, which not only takes time and effort, but also leads to high economic costs; third, while injecting cement slurry into the monitoring hole, because the monitoring hole is deep, not only the grouting effect of the sensor installation site is difficult to be guaranteed, but the situation where the sensor installation site fails to achieve effective grouting may occur, thus the sensor will not be coupled to the monitoring hole rock wall and no monitoring signal will be generated. Moreover, the deeper the monitoring hole is, the greater is the total shrinkage deformation of the poured cement after solidification, and the signal transmission cable cemented with the cement will be subjected to tensile force due to shrinkage deformation of the cement, resulting in failing to transmit signals effectively; fourth, the monitoring hole is usually relatively moist, and the solidification of the cement slurry after pouring requires a long cycle, which will lead to the extension of the construction period; fifth, the blasting of explosives during the excavation may loosen the grouting surface and the rock wall surface, resulting in a decrease in the effectiveness of the transmission of monitored signals; sixth, the installation process takes time and effort, requiring a series of professional grouting equipment and grouting personnel, and requiring a lot of labor.

In engineering applications, simple fixed devices are also used to fix the microseismic sensors in a specific device, and then the microseismic sensors are sent to the installation site with a rigid, non-movable metal rod to be fixed. However, this method has the following disadvantages: first, this method is generally only applicable to shallow depth monitoring holes, and requires that the monitoring holes are completely concentric and the hole walls are smooth, but these requirements cannot be guaranteed in actual construction; secondly, the mounting device has a large size and is only applicable to large-diameter monitoring holes, resulting in a high monitoring hole cost; third, the entire transmission rod and the mounting structure are rigidly inserted into the monitoring hole by applying pressure, not only the friction force is high, prone to wear out of the cable or microseismic sensor, but also the transmission rod and the mounting structure are easy to be stuck in the monitoring hole at a specific position and cannot be sent to a specific installation site; fourth, the installation process is time-consuming, labor-intensive and requires a lot of labor. These difficulties have caused microseismic sensors to be limited in monitoring holes with large depths.

Therefore, how to conveniently and effectively install the microseismic sensor in the monitoring hole and effectively couple the installed microseismic sensor with the wall of the hole are still difficult points for on-site monitoring and research, especially for deep monitoring holes that require multiple microseismic sensors for microseismic monitoring of different sites.

SUMMARY

In view of the present situation and deficiencies of the microseismic monitoring technology of the prior art, the present invention aims to provide a test system for the microseismic test of rock mass fractures, so as to solve the problems of effective contact coupling between the microseismic sensor and the monitoring hole, recycling for reusing and easy installation, improve the accuracy of microseismic monitoring, and reduce the cost of microseismic monitoring systems.

A test system for a microseismic test of rock mass fractures provided by the present invention, including at least one microseismic sensor, a push rod provided at two ends of the microseismic sensor through a connecting mechanism for feeding the microseismic sensor into a monitoring hole, an introducing mechanism mounted on the push rod for introducing the microseismic sensor into the monitoring hole, a hydraulic system providing support hydraulic oil for the microseismic sensor, a microseismic monitoring computer connected with the signal of microseismic sensor; the microseismic sensor includes a microseismic probe, a holding component holding the microseismic probe, a support plate and a hydraulic support mechanism; the holding component can make a lower side surface of the microseismic probe contact and couple with a wall surface of the monitoring hole in which the microseismic probe is disposed, a support side plate surface of the support plate is an arc surface matched with the wall surface of the monitoring hole; the hydraulic support mechanism is a hydraulic cylinder piston support mechanism, symmetrically disposed on two sides of the holding component, and 2 or 3 sets of hydraulic cylinder piston support mechanisms are disposed on each side of the holding component, a bottom of the hydraulic cylinder is arranged at a non-support surface of the support plate or on bases on the two sides of the holding component, a piston is connected to the bases on the two sides of the holding component or the non-support surface of the support plate through a piston rod, a hydraulic oil inlet of a hydraulic oil pressure chamber is connected to an oil supply line of the hydraulic system, a hydraulic oil outlet of the hydraulic oil pressure chamber is connected to an oil return line of the hydraulic system, the lower side surface of the microseismic probe and the support plate are effectively coupled with an inner wall of the monitoring hole under an action of the hydraulic oil so as to monitor a vibration of a rock mass; the connecting mechanism can make the push rod swing relative to the microseismic sensor, and the introducing mechanism is a roller introducing mechanism.

In order to better solve the technical problems to be solved by the present invention, the following technical measures may be further taken. The following technical measures can be taken individually or in combination or even in general.

The holding component is a probe sleeve including a straight cylinder with an opening structure and a cone head, a shape and a structure of a cavity of the probe sleeve is matched with a shape and a structure of the microseismic probe to make the lower side surface of the microseismic probe disposed in the probe sleeve and a cone tip of the microseismic probe stick out of the probe sleeve.

A tail end of the probe sleeve is provided with an end cap connected with a probe sleeve body through a screw thread pair, the microseismic probe is fixedly installed in the cavity of the probe sleeve through the end cap.

Preferably, the hydraulic cylinder piston support mechanism is disposed on two sides of the holding component, and two sets of hydraulic cylinder piston support mechanisms are disposed on each side of the holding component, the bottom of the hydraulic cylinder is arranged on the non-support surface of the support plate, the piston is connected to the back of the holding component through the piston rod.

A connecting structure where the push rod is connected with the microseismic sensor by the connecting mechanism is a polyhedral socket connecting structure. Specifically, the connecting mechanism includes a connecting frame, a threaded sleeve and a connecting rod, a first end of the connecting frame is fixedly connected to one end of the microseismic sensor, a second end of the connecting frame is hinged to the threaded sleeve through a hinge structure, a first end of the connecting rod is processed with an external thread matched with the threaded sleeve, and a second end of the connecting rod is a polyhedral cylinder; a first end of the push rod connected with the connecting mechanism is processed with a polyhedral column hole socketed with the polyhedral cylinder of the connecting rod, and a second end of the push rod is processed with an extended connecting structure, the polyhedral column hole of the push rod and the polyhedral cylinder of the connecting rod constitute a polyhedral socket structure, and the polyhedral cylinder of the connecting rod is fixed in the polyhedral column hole of the push rod by a fastening screw. The polyhedral socket structure may be a tetrahedron socket structure, a hexagonal socket structure, a octahedral socket structure, and preferably the hexagonal socket structure. The extended connecting structure of the push rod may be a threaded connecting structure, a lap joint structure, a socket connecting structure, etc., as long as it can be matched with the extended connecting structure to form the connecting pair.

Further, the connecting frame in the connecting mechanism may be designed to include a ring matched with the microseismic sensor, a connecting head and two connecting arms with bending structures, the two connecting arms are symmetrically arranged, a first end of the connecting arm is fixedly connected with the ring, and a second end of the connecting arm is connected with the connecting head, the connecting frame is hinged to the threaded sleeve through the connecting head so that the push rod can swing relative to the microseismic sensor.

The hydraulic system includes the oil supply line and the oil return line, first ends of the oil supply line and the oil return line are connected to a hydraulic oil tank, second ends of the oil supply line and the oil return line are connected to the hydraulic oil pressure chamber, a pressure oil pump, a control valve, and an oil pressure gauge are provided on the oil supply line, and a control valve is provided on the oil return line.

The roller introducing mechanism is three-rollers introducing mechanism, the three rollers of the three-rollers introducing mechanism are arranged along two diametric directions perpendicular to each other and move along the wall surface of the monitoring hole respectively, one roller is opposite to the support plate in the microseismic sensor, and the other two rollers are oppositely arranged.

Using the microseismic monitoring system provided by the present invention to perform microseismic monitoring, when the monitoring hole is relatively deep, multiple microseismic sensors can be used to perform microseismic monitoring on different azimuths of the monitoring hole. The microseismic sensors can be connected to each other by the extended connecting structure at the tail end of the push rod and an extended rod to constitute a monitoring system for the extending need.

The hydraulic twin-cylinder support retrievable microseismic monitoring system provided by the present invention solves the problems of installation and effective coupling of multiple microseismic sensors for a monitoring hole with a relatively large depth and requiring multiple microseismic sensors to perform microseismic monitoring on different parts, further filling the technical gap. The outstanding features are as follows:

First, not only the installation of the microseismic sensor is simple and easy, saving a lot of manpower, but also the hydraulic twin-cylinder support retrievable microseismic monitoring system overcomes the adverse effects of monitoring holes due to different depths and directions.

Second, microseismic sensors can be checked during the test process, and microseismic sensors can also be recycled for reusing, reducing the usage cost.

Third, multiple sensors can be arranged in the same monitoring hole as required, the orientation of the effective monitoring surface of each microseismic sensor can be determined separately according to the monitoring needs during installation by the ingeniously designed connecting mechanism.

Fourth, the ingeniously designed hydraulic support mechanism ensures that the microseismic sensor can be effectively coupled with the monitoring hole wall under the unfavorable conditions such as nonconcentricity due to the fracture of the rock mass or the deep monitoring hole.

Fifth, the rolling transmission in the installation process is realized, the influence of friction is overcome, and the integrity of the sensor and the transmission cable is ensured.

In short, the present invention not only ensures the installation and coupling effect, improving the installation efficiency, but also ensures the recovery and reuse of microseismic sensors, saving the costs.

BRIEF DESCRIPTION OF THE DRAWINGS

FIG. 6-1 and FIG. 6-2 are schematic diagrams of a connecting structure between a push rod and a microseismic sensor; FIG. 6-1 is a front view of the connecting structure; FIG. 6-2 is a top view of the connecting structure.

FIG. 7-1, FIG. 7-2, and FIG. 7-3 are structural diagrams of a push rod; FIG. 7-1 is a front view; FIG. 7-2 is a left view; FIG. 7-3 is a top view.

FIG. 8-1, FIG. 8-2, and FIG. 8-3 are structural diagrams of a connecting rod, FIG. 8-1 is a front view; FIG. 8-2 is a left view; and FIG. 8-3 is a top view.

FIG. 9-1, FIG. 9-2 and FIG. 9-3 are structural diagrams of an introducing mechanism, FIG. 9-1 is a structural diagram of the introducing mechanism in a direction of C in FIG. 1, and FIG. 9-2 is a left view of the introducing mechanism shown in FIG. 9-1, FIG. 9-3 is a top view of the introducing mechanism shown in FIG. 9-1.

Figure 1:
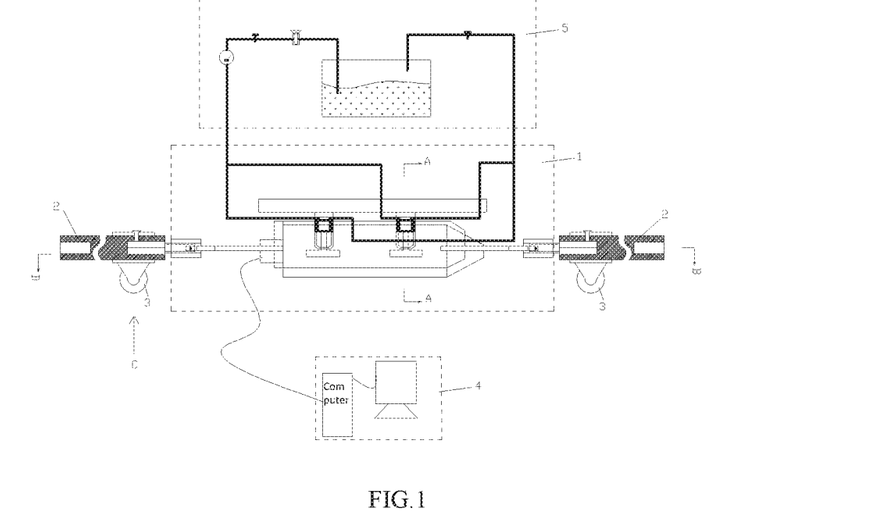
FIG. 1 is a schematic diagram of a microseismic monitoring system according to the present invention.
Figure 2:
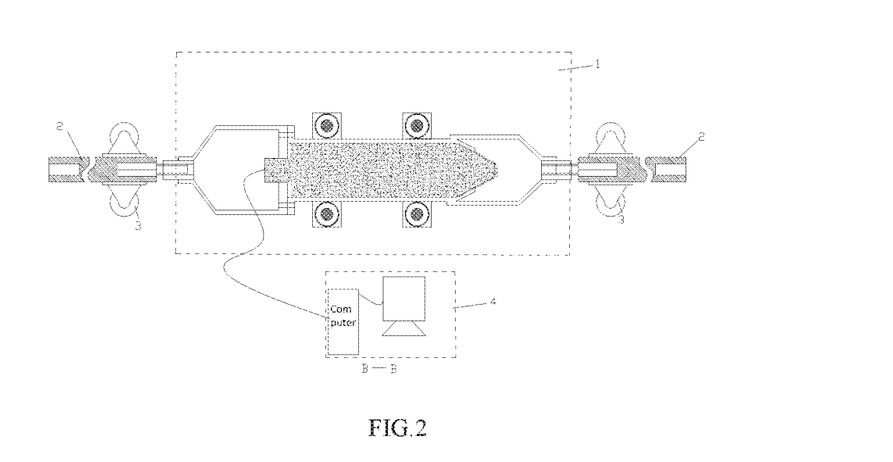
FIG. 2 is a schematic diagram in a direction of B-B (top view) in FIG. 1.
Figure 3:
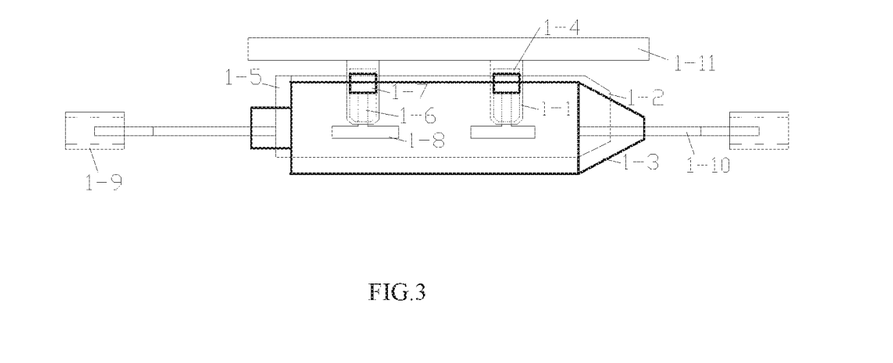
FIG. 3 is an enlarged schematic view of Part 1 (microseismic sensor) in FIG. 1.
Figure 4:
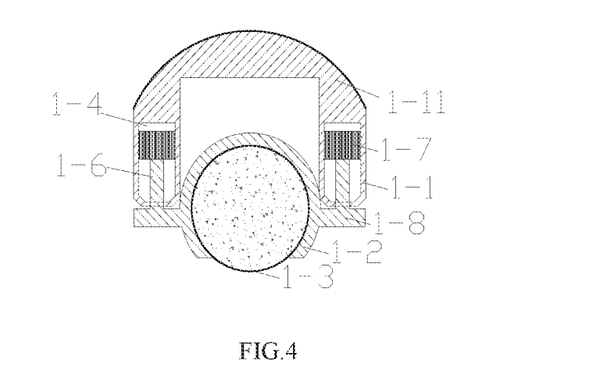
FIG. 4 is a schematic diagram in a direction of A-A in FIG. 1.
Figure 5:
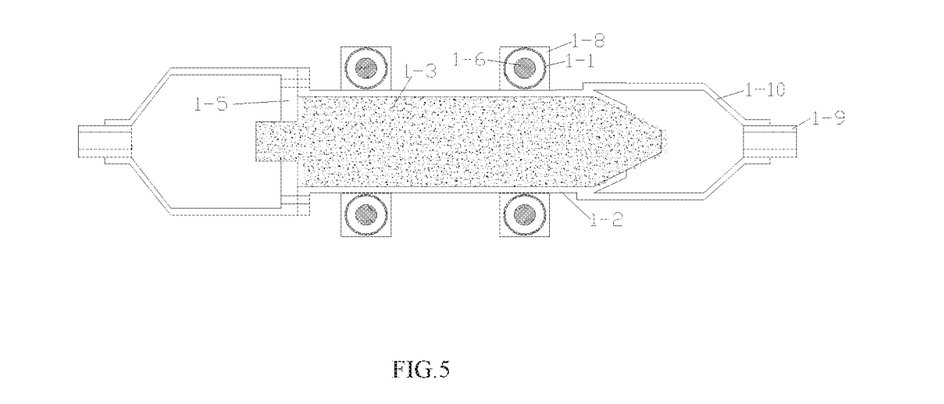
FIG. 5 is a schematic diagram of Part 1 (bottom view) in FIG. 2.
Figure 10:
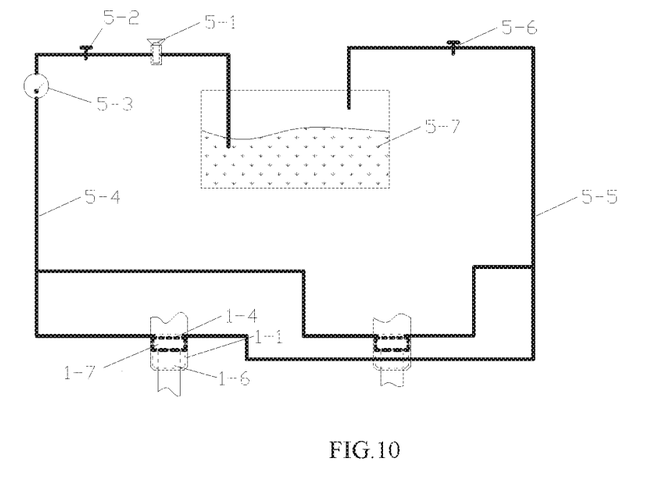
FIG. 10 is an enlarged schematic view of the hydraulic system of FIG. 1.
Figure 61:
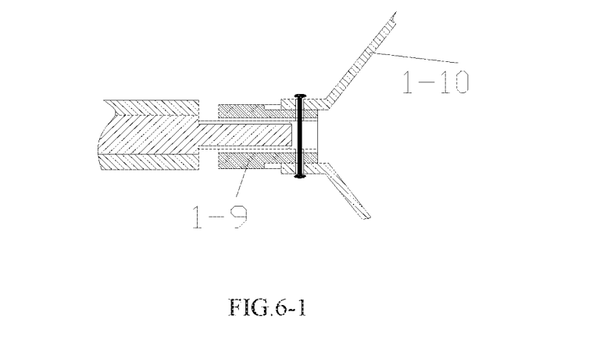
Figure 62:
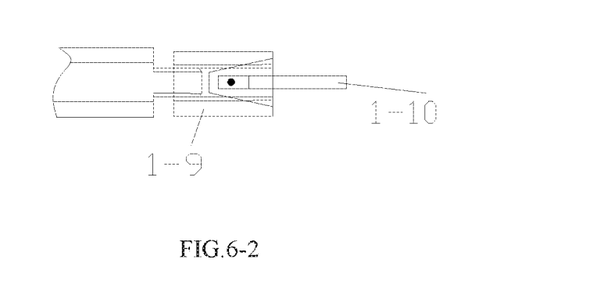
Figure 71:
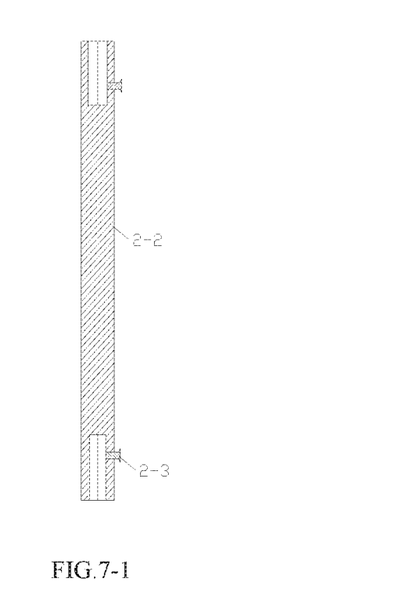
Figure 72:
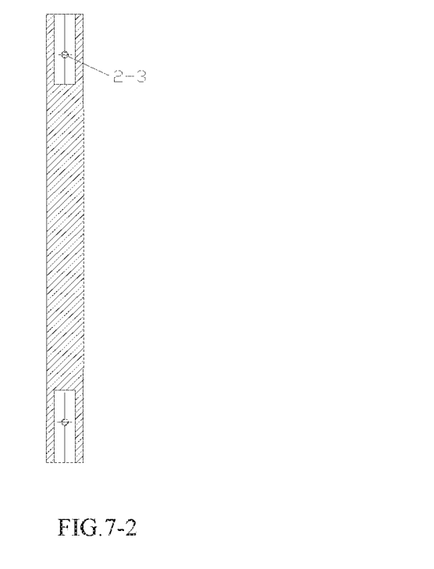
Figure 73:
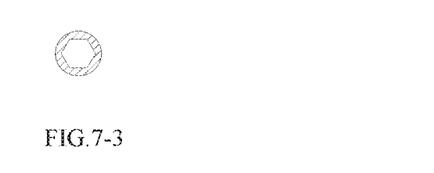
Figure 81:
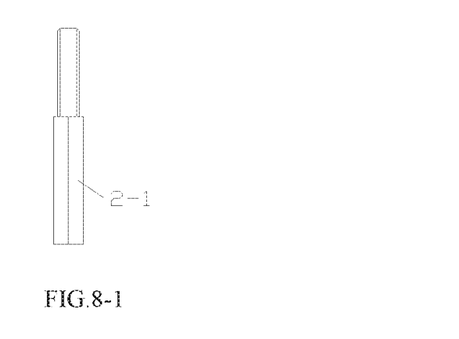
Figure 82:
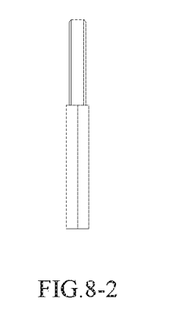
Figure 83:
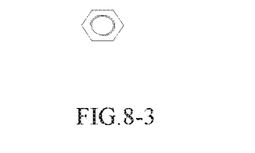
Figure 91:
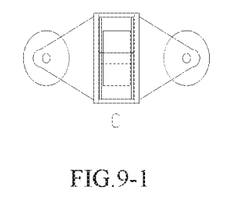
Figure 92:
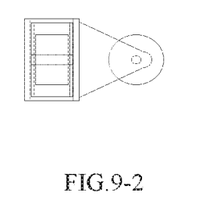
Figure 93:
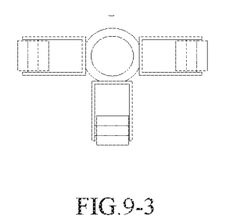

In the above drawings, 1 is microseismic sensor; 2 is push rod; 3 is introducing mechanism; 4 is monitoring computer; 5 is hydraulic system; among them, 1-1 is hydraulic cylinder; 1-2 is probe sleeve; 1-3 is microseismic probe; 1-4 is hydraulic oil pressure chamber; 1-5 is end cap; 1-6 is piston rod; 1-7 is piston; 1-8 lug seat; 1-9 is threaded sleeve; 1-10 is connecting frame; 1-11 is support plate; 2-1 is connecting rod; 2-2 is push rod body; 2-3 is fastening screw; 5-1 is pressure oil pump; 5-2 is control valve; 5-3 is oil pressure gauge; 5-4 is oil supply line; 5-5 is oil return line; 5-6 is control valve ;5-7 is hydraulic oil tank.

DETAILED DESCRIPTION

Hereinafter, embodiments of the present invention will be described with reference to the accompanying drawings, the microseismic monitoring system with reusable microseismic sensor according to the present invention will be further described through the embodiments.

The hydraulic twin-cylinder support retrievable microseismic monitoring system in this embodiment has the structure shown in FIGS. 1-10, including one microseismic sensor 1, a push rod 2 provided at two ends of the microseismic sensor through a connecting mechanism for feeding the microseismic sensor into a monitoring hole, an introducing mechanism 3 mounted on the push rod for introducing the microseismic sensor into the monitoring hole, a hydraulic system 5 providing support hydraulic oil for the microseismic sensor, and a microseismic monitoring computer 4 connected with the signal of microseismic sensor. The microseismic sensor is a retrievable microseismic sensor, including a microseismic probe 1-3, a probe sleeve 1-2 holding the microseismic probe, an end cap 1-5 mounting and fixing the probe inside the probe sleeve 1-2, a support plate 1-11 and a hydraulic support mechanism; the probe sleeve 1-2 includes a straight cylinder with an opening structure and a cone head, the shape and structure of the cavity of the probe sleeve 1-2 are matched with the shape and structure of the microseismic probe 1-3 so as to make the lower side surface of the microseismic probe 1-3 disposed in the probe sleeve 1-2 and a cone tip of the microseismic probe 1-3 stick out of the probe sleeve 1-2, and the lower side surface of the microseismic probe 1-3 disposed in the probe sleeve 1-2 contact and couple with the wall surface of the monitoring hole; a support side plate surface of the support plate 1-11 is an arc surface matched with the wall surface of the monitoring hole; the hydraulic support mechanism is a hydraulic cylinder piston support mechanism, symmetrically disposed on the lug seat 1-8 of the lug structure located on the two sides of the probe sleeve 1-2, two sets of hydraulic cylinder piston support mechanisms are disposed on each side of the probe sleeve 1-2, the bottom of the hydraulic cylinder 1-1 is arranged at the non-support surface of the support plate 1-11, the piston 1-7 is connected to the lug seat 1-8 located on the side of the probe sleeve 1-2 through the piston rod 1-6. The hydraulic oil inlet of a hydraulic oil pressure chamber 1-4 is connected to the oil supply line 5-4 of the hydraulic system 5, the hydraulic oil outlet of the hydraulic oil pressure chamber 1-4 is connected to the oil return line 5-5 of the hydraulic system 5, the lower side surface of the microseismic probe 1-3 and the support surface of the support plate 1-11 are effectively coupled with the inner wall of the monitoring hole under the action of the hydraulic oil so as to monitor the vibration of the rock mass. One end of the push rod 2 connected with the connecting mechanism is processed with a hexagonal column hole, the other end is processed with a hexagonal column hole connected to the extended rod. The connecting mechanism includes a connecting frame 1-10, a threaded sleeve 1-9 and a connecting rod 2-1, the connecting frame includes a ring fixedly connected with the microseismic sensor, a connecting head and two connecting arms with bending structures, the two connecting arms are symmetrically arranged, a first end of the connecting arm is fixedly connected with the ring, and a second end of the connecting arm is connected with the connecting head, the connecting frame 1-10 is hinged to the threaded sleeve 1-9 through the connecting head; one end of the connecting rod 2-1 is processed with an external thread matched with the threaded sleeve 1-9, the other end of the connecting rod 2-1 is a hexagonal cylinder socketed with the polyhedral column hole of the push rod, the hexagonal cylinder of the connecting rod 2-1 is fixed in the hexagonal column hole by fastening screws. The roller introducing mechanism 3 is three-rollers introducing mechanism, the three rollers of the three-rollers introducing mechanism are arranged along two diametric directions perpendicular to each other and move along the wall surface of the monitoring hole respectively, one roller is opposite to the support plate 1-11 in the microseismic sensor, and the other two rollers are oppositely arranged. The hydraulic system 5 includes the oil supply line 5-4 and the oil return line 5-5, first ends of the oil supply line 5-4 and the oil return line 5-5 are connected to the hydraulic oil tank 5-7, second ends of the oil supply line 5-4 and the oil return line 5-5 are connected to the hydraulic oil pressure chamber 1-4, a pressure oil pump 5-1, a control valve 5-2, and an oil pressure gauge 5-3 are provided on the oil supply line 5-4, and a control valve 5-6 is provided on the oil return line 5-5.

Method of using: mounting the microseismic probe 1-3 in the probe sleeve 1-2, and fixing the microseismic probe 1-3 in the cavity of the probe sleeve 1-2 through the end cap 1-5; connecting and fixing the piston rod 1-6 with the piston 1-7, and then installing the piston rod 1-6 and the piston 1-7 into the hydraulic cylinder 1-1, connecting the bottom of the hydraulic cylinder 1-1 to the support plate 1-11, connecting the piston to the lug seat on the side of the probe sleeve 1-2 through the piston rod; installing the push rod 2 at the two ends of the microseismic sensor 1 through the connecting mechanism; installing the three-rollers introducing mechanism 3 on the push rod; connecting the signal output of the microseismic sensor with the signal input of the monitoring computer; connecting the oil supply line of the hydraulic system 5 with the hydraulic oil inlet of the hydraulic oil pressure chamber, and connecting the oil return line of the hydraulic system 5 with the hydraulic oil outlet of the hydraulic oil pressure chamber; sending the microseismic sensor into the monitoring hole by using the push rod and the introducing mechanism installed on the push rod. When the microseismic sensor is in the right place, starting the pressure oil pump in the hydraulic system, opening the control valve 5-4 on the oil supply line and closing the control valve 5-6 on the oil return line, the hydraulic oil then enters into the hydraulic oil pressure chamber 1-4 of the hydraulic cylinder, when the pressure value on the oil pressure gauge reaches the predetermined pressure value, closing the pressure oil pump 5-1 and the control valve 5-4, at this time, the lower side surface of the microseismic probe 1-3 and the support side arc plate surface of the support plate are effectively coupled with the inner wall of the monitoring hole under the action of the hydraulic oil so as to monitor the vibration of the rock mass. When it is necessary to recycle the microseismic sensor, closing the control valve on the oil supply line, opening the control valve on the oil return line, and connecting the pressure oil pump 5-1 to the oil return line to apply negative pressure to the hydraulic oil pressure chamber 1-4, the hydraulic oil in the hydraulic oil pressure chamber of the hydraulic cylinder returns to the hydraulic oil tank to relieve the support force for the support plate and the microseismic probe, so that the microseismic sensor can be effectively recycled.

It is necessary to point out that the above embodiments are merely used to further describe the present invention, and it should not be understood as limiting the protection scope of the present invention. Those skilled in the art can make some non-essential improvements and adjustments to the present invention according to the content of the invention. The specific implementation still belongs to the protection scope of the present invention.

What is claimed is:
1. A test system for a-microseismic monitoring of rock mass fractures, comprising at least one microseismic sensor, a push rod provided at two ends of the microseismic sensor through a connecting mechanism for feeding the microseismic sensor into a monitoring hole, an introducing mechanism mounted on the push rod for introducing the microseismic sensor into the monitoring hole, a hydraulic system providing hydraulic oil to the microseismic sensor to relieve the support force acting on the microseismic sensor, a microseismic monitoring computer communicably coupled to the microseismic sensor to receive signals from the microseismic sensor; wherein the microseismic sensor comprises a microseismic probe, a holding component holding the microseismic probe, a support plate and a hydraulic support mechanism; wherein the holding component makes a lower side surface of the microseismic probe contact and couple with a wall surface of the monitoring hole in which the microseismic probe is disposed, a support side plate surface of the support plate is an arc surface matched with the wall surface of the monitoring hole; the hydraulic support mechanism is a hydraulic cylinder piston support mechanism, symmetrically disposed on two sides of the holding component, and 2 or 3 sets of hydraulic cylinder piston support mechanisms are disposed on each of the two sides of the holding component, a bottom of a hydraulic cylinder is arranged at a non-support surface of the support plate or on bases on the two sides of the holding component, a piston is connected to the bases on the two sides of the holding component or the non-support surface of the support plate through a piston rod, a hydraulic oil inlet of a hydraulic oil pressure chamber is connected to an oil supply line of the hydraulic system, a hydraulic oil outlet of the hydraulic oil pressure chamber is connected to an oil return line of the hydraulic system, the lower side surface of the microseismic probe and the support plate are effectively coupled with an inner wall of the monitoring hole under an action of the hydraulic oil so as to monitor a vibration of a rock mass; wherein the connecting mechanism makes the push rod swing relative to the microseismic sensor, and the introducing mechanism is a roller introducing mechanism.

2. The test system for the microseismic monitoring of rock mass fractures according to claim 1, wherein the holding component is a probe sleeve comprising a straight cylinder with an opening structure and a cone head, a shape and a structure of a cavity of the probe sleeve are matched with a shape and a structure of the microseismic probe to make the lower side surface of the microseismic probe disposed in the probe sleeve and a cone tip of the microseismic probe stick out the probe sleeve.

3. The test system for the microseismic monitoring of rock mass fractures according to claim 2, wherein a tail end of the probe sleeve is provided with an end cap connected with a probe sleeve body through a screw thread pair, the microseismic probe is fixedly installed in the cavity of the probe sleeve through the end cap.

4. The test system for the microseismic monitoring of rock mass fractures according to claim 1, wherein the hydraulic cylinder piston support mechanism is disposed on two sides of the holding component, and two sets of hydraulic cylinder piston support mechanisms are disposed on each of the two sides of the holding component, the bottom of the hydraulic cylinder is arranged at the non-support surface of the support plate, the piston is connected to a lug seat of a lug structure located on a side surface of the holding component through the piston rod.

5. The test system for the microseismic monitoring of rock mass fractures according to claim 1, wherein a connecting structure that the push rod is connected with the microseismic sensor by the connecting mechanism is a polyhedral socket connecting structure.

6. The test system for the microseismic monitoring of rock mass fractures according to claim 5, wherein the connecting mechanism comprises a connecting frame, a threaded sleeve and a connecting rod, a first end of the connecting frame is fixedly connected to one of the two ends of the microseismic sensor, a second end of the connecting frame is hinged to the threaded sleeve through a hinge structure, a first end of the connecting rod is processed with an external thread matched with the threaded sleeve, and a second end of the connecting rod is a polyhedral cylinder connected with the push rod; a first end of the push rod and the polyhedral cylinder of the connecting rod of the connecting mechanism constitute a socketed polyhedral column hole, and a second end of the push rod is processed with an extended connecting structure, wherein the polyhedral cylinder of the connecting rod is fixed in the polyhedral column hole of the push rod through a fastening screw.

7. The test system for the microseismic monitoring of rock mass fractures according to claim 6, wherein the polyhedral cylinder of the connecting rod is a hexagonal cylinder, wherein the polyhedral column hole formed by socketing the push rod with the polyhedral cylinder of the connecting rod of the connecting mechanism is a hexagonal column hole, the extended connecting structure on the second end of the push rod is a threaded extended connecting hole structure.

8. The test system for the microseismic monitoring of rock mass fractures according to claim 6, wherein the connecting frame comprises a ring matched with the microseismic sensor, a connecting head and two connecting arms with bending structures, the two connecting arms are symmetrically arranged, a first end of the connecting arm is fixedly connected with the ring, and a second end of the connecting arm is connected with the connecting head, the connecting head is connected to the threaded sleeve through the hinge structure so that the push rod swings relative to the microseismic sensor.

9. The test system for the microseismic monitoring of rock mass fractures according to claim 1, wherein the hydraulic system comprises the oil supply line and the oil return line, wherein first ends of the oil supply line and the oil return line are connected to a hydraulic oil tank, second ends of the oil supply line and the oil return line are connected to the hydraulic oil pressure chamber, a pressure oil pump, a control valve, and an oil pressure gauge are provided on the oil supply line, and a control valve is provided on the oil return line.

10. The test system for the microseismic monitoring of rock mass fractures according to claim 1, wherein the roller introducing mechanism is three-rollers introducing mechanism, three rollers of the three-rollers introducing mechanism are arranged along two diametric directions perpendicular to each other and move along the wall surface of the monitoring hole respectively, a first roller is opposite to the support plate in the microseismic sensor, and a second roller and a third roller are oppositely arranged.

11. The test system for the microseismic monitoring of rock mass fractures according to claim 2, wherein the hydraulic cylinder piston support mechanism is disposed on two sides of the probe sleeve, and two sets of hydraulic cylinder piston support mechanisms are disposed on each of the two sides of the probe sleeve, the bottom of the hydraulic cylinder is arranged at the non-support surface of the support plate, the piston is connected to a lug seat of a lug structure located on a side surface of the probe sleeve through the piston rod.

12. The test system for the microseismic monitoring of rock mass fractures according to claim 3, wherein the hydraulic cylinder piston support mechanism is disposed on two sides of the probe sleeve, and two sets of hydraulic cylinder piston support mechanisms are disposed on each of the two sides of the probe sleeve, the bottom of the hydraulic cylinder is arranged at the non-support surface of the support plate, the piston is connected to a lug seat of a lug structure located on a side surface of the probe sleeve through the piston rod.

13. The test system for the microseismic monitoring of rock mass fractures according to claim 2, wherein a connecting structure that the push rod is connected with the microseismic sensor by the connecting mechanism is a polyhedral socket connecting structure.

14. The test system for the microseismic monitoring of rock mass fractures according to claim 3, wherein a connecting structure that the push rod is connected with the microseismic sensor by the connecting mechanism is a polyhedral socket connecting structure.

15. The test system for the microseismic monitoring of rock mass fractures according to claim 13, wherein the connecting mechanism comprises a connecting frame, a threaded sleeve and a connecting rod, a first end of the connecting frame is fixedly connected to one of the two ends of the microseismic sensor, a second end of the connecting frame is hinged to the threaded sleeve through a hinge structure, a first end of the connecting rod is processed with an external thread matched with the threaded sleeve, and a second end of the connecting rod is a polyhedral cylinder connected with the push rod; a first end of the push rod and the polyhedral cylinder of the connecting rod of the connecting mechanism constitute a socketed polyhedral column hole , and a second end of the push rod is processed with an extended connecting structure, wherein the polyhedral cylinder of the connecting rod is fixed in the polyhedral column hole of the push rod through a fastening screw.

16. The test system for the microseismic monitoring of rock mass fractures according to claim 14, wherein the connecting mechanism comprises a connecting frame, a threaded sleeve and a connecting rod, a first end of the connecting frame is fixedly connected to one of the two ends of the microseismic sensor, a second end of the connecting frame is hinged to the threaded sleeve through a hinge structure, a first end of the connecting rod is processed with an external thread matched with the threaded sleeve, and a second end of the connecting rod is a polyhedral cylinder connected with the push rod; a first end of the push rod and the polyhedral cylinder of the connecting rod of the connecting mechanism constitute a socketed polyhedral column hole , and a second end of the push rod is processed with an extended connecting structure, wherein the polyhedral cylinder of the connecting rod is fixed in the polyhedral column hole of the push rod through a fastening screw.

17. The test system for the microseismic monitoring of rock mass fractures according to claim 15, wherein the polyhedral cylinder of the connecting rod is a hexagonal cylinder, wherein the polyhedral column hole formed by socketing the push rod with the polyhedral cylinder of the connecting rod of the connecting mechanism is a hexagonal column hole, the extended connecting structure on the second end of the push rod is a threaded extended connecting hole structure.

18. The test system for the microseismic monitoring of rock mass fractures according to claim 15, wherein the connecting frame comprises a ring matched with the microseismic sensor, a connecting head and two connecting arms with bending structures, the two connecting arms are symmetrically arranged, a first end of the connecting arm is fixedly connected with the ring, and a second end of the connecting arm is connected with the connecting head, the connecting head is connected to the threaded sleeve through the hinge structure so that the push rod swings relative to the microseismic sensor.

19. The test system for the microseismic monitoring of rock mass fractures according to claim 2, wherein the hydraulic system comprises the oil supply line and the oil return line, wherein first ends of the oil supply line and the oil return line are connected to a hydraulic oil tank, second ends of the oil supply line and the oil return line are connected to the hydraulic oil pressure chamber, a pressure oil pump, a control valve, and an oil pressure gauge are provided on the oil supply line, and a control valve is provided on the oil return line.

20. The test system for the microseismic monitoring of rock mass fractures according to claim 2, wherein the roller introducing mechanism is three-rollers introducing mechanism, three rollers of the three-rollers introducing mechanism are arranged along two diametric directions perpendicular to each other and move along the wall surface of the monitoring hole respectively, a first roller is opposite to the support plate in the microseismic sensor, and a second roller and a third roller are oppositely arranged.

* * * * *